United States Patent [19]

Wanmaker et al.

[11] B 3,925,239

[45] Dec. 9, 1975

[54] METHOD OF MANUFACTURING A LUMINESCENT ALKALINE EARTH HALOPHOSPHATE

[75] Inventors: Willem Lambertus Wanmaker; Dragutin Radielovic, both of Eindhoven, Netherlands

[73] Assignee: U.S. Philips Corporation, New York, N.Y.

[22] Filed: Sept. 11, 1972

[21] Appl. No.: 288,018

[44] Published under the Trial Voluntary Protest Program on January 28, 1975 as document no. B 288,018.

[30] Foreign Application Priority Data

Sept. 11, 1971 Netherlands............... 7112525

[52] U.S. Cl. ........................................ 252/301.4 P
[51] Int. Cl.$^2$........................................ C09K 11/44
[58] Field of Search .............. 252/301.4 P, 301.6 P

[56] References Cited
UNITED STATES PATENTS

| | | | |
|---|---|---|---|
| 3,157,603 | 11/1964 | Mooney et al. | 252/301.4 P X |
| 3,378,499 | 4/1968 | Hickok | 252/301.4 P |
| 3,468,812 | 9/1969 | Wanmaker et al. | 252/301.4 P |
| 3,575,876 | 4/1971 | Piper | 252/301.4 P |
| 3,637,519 | 1/1972 | Piper | 252/301.4 P |

OTHER PUBLICATIONS

Hoekstra "Philips Research Reports," Suppl. No. 2, 1968.

*Primary Examiner*—Jack Cooper
*Attorney, Agent, or Firm*—Frank R. Trifari; Norman N. Spain

[57] ABSTRACT

A method of manufacturing a luminescent alkaline earth halophosphate having the apatite crystal structure and being activated by trivalent antimony and optionally also by bivalent manganese in which antimony is contacted as a gaseous antimony trioxide in an inert atmosphere at a temperature of between 900° and 1,250°C with a reaction mixture from which an alkaline earth halophosphate having the apatite structure can be produced or is contacted with a formed non-activated alkaline earth halophosphate having the apatite structure or with an alkaline earth halophosphate comprising manganese only. The gaseous antimony trioxide is formed by heating a mixture which comprises an antimonite of one or more of the alkaline earth metals, of cadmium or of manganese, or of a mixture which comprises an antimonate of one or more of the alkaline earth metals, of cadmium or manganese and a pyrophosphate.

5 Claims, No Drawings

METHOD OF MANUFACTURING A LUMINESCENT ALKALINE EARTH HALOPHOSPHATE

The invention relates to a method of manufacturing luminescent alkaline earth halophosphates having the apatite crystal structure and being activated by trivalent antimony and optionally also by bivalent manganese, and to luminescent halophosphates manufactured in this manner.

Halophosphates of the kind described above are very frequently used for converting short-wave ultraviolet radiation into visible radiation, for example, in gas discharge lamps, particularly in low-pressure mercury vapour discharge lamps. The host lattice of these halophosphates may be represented by the general formula $M_{10}(PO_4)_6X_2$, in which M represents at least one of the alkaline earth metals and X represents at least one of the halogens chlorine and fluorine. Compounds which comprise trivalent antimony only as an activator emit blue light upon excitation by short-wave ultraviolet radiation. Since it is desired that the luminescent material emits substantially white light for use in gas discharge lamps for general illumination purposes, bivalent manganese is often used as an activator in addition to trivalent antimony. To improve the quality of the luminescent halophosphate a small quantity of cadmium is often built in the apatite lattice.

The manufacture of the said halophosphates is a very intricate process due to the large number of components which must react with one another so as to form the apatite lattice incorporating the correct quantity of activator. A large number of manufacturing methods has been described in literature. One of the most important objects of all these manufacturing methods is to obtain a luminescent material having an optimum quantum efficiency.

In the known manufacturing methods the antimony is usually introduced into the reaction mixture as antimony trioxide ($Sb_2O_3$). This reaction mixture may furthermore comprise widely divergent compounds for introducing the alkaline earth metals, the phosphate groups, the halogens and optionally the manganese activator. It is common practice that the alkaline earth metals and the phosphate groups are partly introduced in combination as alkaline earth hydrophosphate (for example, $CaHPO_4$). Furthermore, a quantity of alkaline earth carbonate is introduced into the reaction mixture so as to bring the quantity of alkaline earth metal to the correct value. The halogens are often introduced into the mixture as halides of one or more of the alkaline earth metals or of ammonium. Manganese is often added as a carbonate, oxalate, or as manganese ammonium phosphate. Furthermore a small quantity of cadmium may be introduced as cadmium oxide or cadmium ammonium phosphate.

A manufacturing method in which the antimony compound (generally $Sb_2O_3$) is directly added to the reaction mixture has different drawbacks. In the first place a strong sintering of the reaction product may occur especially at high antimony contents. Such a sintered product is to be intensively ground so as to render the luminescent material suitable for practical use. A grinding process is, however, undesirable because in most cases the quantum efficiency of the luminescent material is detrimentally influenced. Furthermore a grinding process not only yields grains of the desired dimensions but also a large quantity of very fine grains which in the case of luminescent halophosphates have the drawback of a low absorption of ultraviolet radiation. In the second place the use of antimony trioxide in the firing mixture has the drawback that this oxide is rather volatile and also readily forms antimony halides with the halogens in the reaction mixtures, which halides are very volatile at the temperatures which are required for the formation of the apatite. Furthermore antimony trioxide may give rise to the formation of unwanted side phases, for example, calcium antimonate which side phases absorb part of the exciting ultraviolet radiation when the luminescent material is used in lamps without converting this radiation into visible radiation. The abovementioned phenomena further result in the antimony content of the halophosphates manufactured in this manner being very difficult to control.

A further serious drawback which is found to occur when the antimony compound is directly added to the reaction mixture is that an optimum quantum efficiency of the halophosphate is achieved at comparatively low antimony contents (approximately 0.60 to 0.80 percent by weight). Higher antimony contents of up to approximately 1.50 percent by weight are possible if special precautions are taken during manufactures, but the quantum efficiency of these halophosphates is then generally found to be considerably lower than that of the materials which comprise 0.60 to 0.80 percent by weight of antimony. A higher antimony content of luminescent halophosphates is, however, very much desirable because the absorption of ultraviolet radiation will then be higher and thereby creates the possibility of using finer halophosphate grains. When using finer halophosphate grains it is possible to use lower powder weights in the lamps and this results in a considerable economical advantage.

It is known in order to avoid strong sintering during formation of luminescent silicates (see U.S. Pat. No. 2,497,140) to contact the activator compound in the gas phase with the reaction mixture from which the silicate is formed. Activation of halophosphates by antimony through the gas phase is known from the thesis by A. H. Hoekstra (see Philips Research Reports. Supplement 1968, no. 2). In this method $Sb_2O_3$ vapour is used as an antimony compound which is formed by heating a quantity of antimony trioxide. Since antimony trioxide evaporates at temperatures which are much lower than those at which the halophosphate lattice is formed or at which a lattice already formed is activated, it is necessary to have an extra furnace in which the $Sb_2O_3$ vapour is formed or to have a furnace having two temperature zones. This results in the drawbacks of an intricate furnace equipment and/or clogging of the $Sb_2O_3$ supply duct. Experiments and measurements mentioned in the above-mentioned publication show that the halophosphates thus obtained neither have high antimony contents nor high quantum efficiencies.

The object of the invention is to provide a method of manufacturing luminescent halophosphates which have both a high antimony content and a high quantum efficiency.

According to the invention a method of manufacturing a luminescent alkaline earth halophosphate having the apatite crystal structure and being activated by trivalent antimony and optionally also by bivalent manganese, in which antimony is contacted as a gaseous antimony trioxide an in inert atmosphere at a temperature of between 900° and 1,250°C with a reaction mixture from which an alkaline earth halophosphate having the apatite structure can be produced, or is contacted with a formed non-activated alkaline earth halophosphate having the apatite structure or with an alkaline earth halophosphate having the apatite structure and comprising as an activator manganese only, and is characterized in that the gaseous antimony trioxide is formed by heating a mixture which comprises an antimonite of one or more of the alkaline earth metals, of cadmium or of manganese, or of a mixture which comprises an antimonate of one or more of the alkaline earth metals, of cadmium or of manganese and a pyrophosphate.

In a method according to the invention activation of halophosphate by trivalent antimony is effected through the gas phase. In this method antimony trioxide vapour is used which is obtained by heating an antimonite, a mixture comprising an antimonite or a mixture comprising an antimonate and a pyrophosphate. Antimonites and/or antimonates of one or more of the alkaline earth metals and/or of cadmium and/or of manganese are used. The manufacture of the said antimonites is described in Recueil des Traveaux Chimiques des Pays-Bas, 86, (1967) 537–44.

Luminescent halophosphates which are only slightly sintered and whose antimony contents may be considerably higher than those of the halophosphates manufactured in known manner can be obtained by a method according to the invention, namely up to approximately 1.5 percent by weight. As a result of these high antimony contents the halophosphates according to the invention have a high absorption of ultraviolet radiation. In addition the halophosphates according to the invention are found to have a quantum efficiency which is comparable to the highest quantum efficiencies which can be obtained with the known halophosphates. As a result of their high quantum efficiency and their high absorption of ultraviolet radiation the halophosphates according to the invention may be used in smaller quantities in the luminescent screen of a low-pressure mercury vapour discharge lamp than in the case of the known halophosphates in which the value of the luminous flux emitted by the lamp remains the same. A method according to the invention thus results in a considerable cost economy.

Another advantage of a method according to the invention is that the antimony loss is generally smaller than when using a known method in which antimony trioxide is mixed in the firing mixture. This is not only an economical advantage but also leads to less contamination of the furnaces to be used and a slighter emission of antimony-containing vapours to the atmosphere.

A further advantage of a method according to the invention is that the evolution of antimony trioxide vapour can be accurately controlled the desired quantity of $Sb_2O_3$ vapour only being added at the desired instants during formation of the halophosphate lattice or during activation of a previously formed halophosphate lattice. Due to this accurate control of the $Sb_2O_3$ supply the formation of unwanted side phases is limited to a minimum.

The formation of $Sb_2O_3$ vapour from the said compounds or from mixtures of compounds may be effected at temperatures of between 900° and 1,250°C. In fact, at these temperatures $Sb_2O_3$ vapour is evolved in suffucient quantities per unit of time. Since in the said temperature range the formation of the alkaline earth halophosphate lattice and also the activation of such a lattice by trivalent antimony is possible, it is not necessary to use a separate furnace for the formation of $Sb_2O_3$ vapour. A method according to the invention is preferred in which a first reaction vessel containing the reaction mixture from which alkaline earth halophosphate may be produced or containing the formed non-activated alkaline earth halophosphate, or alkaline earth halophosphate comprising manganese only is placed in a furnace, in which one or more further reaction vessels containing the mixture comprising antimonite or antimonate are placed in the furnace in the vicinity of the first reaction vessel and in which the furnace is subsequently brought to a temperature of between 900° and 1,250°C for at least 0.25 hour while passing through an inert gas. Without having to use intricate furnace equipment this method provides the possibility of bulk manufacturing in a simple manner luminescent halophosphates having both a high quantum efficiency and a high absorption of ultraviolet radiation.

The quantity of $Sb_2O_3$ vapour which is supplied per unit of time is larger as the temperature at which the mixture of compounds is heated is higher. Furthermore this quantity is dependent on the composition of the mixture comprising antimonite and/or antimonate. When using an antimonate it is to be mixed with a pyrophosphate, for example, a pyrophosphate of an alkaline earth metal because otherwise $Sb_2O_3$ formation does not take place. The molar ratio between antimonate and pyrophosphate in the mixture may be chosen to be, for example, between 4 and 0.5. Such a mixture produces relatively little $Sb_2O_3$ per unit of time. The use of an antimonite, particularly an antimonite of calcium and/or strontium is preferred because larger quantities of $Sb_2O_3$ are produced.

In a preferred embodiment of a method according to the invention an antimonite which is mixed with calcium and/or strontium pyrophosphate is used. As compare with pure antimonite, such a mixture yields a larger quantity of $Sb_2O_3$ per unit of time. For a pyrophosphate content of approximately 1 mol per mol of antimonite the $Sb_2O_3$ output at a given temperature is at a maximum.

A method according to the invention is preferred in which the reaction mixture or the formed nonactivated halophosphate and the mixture producing antimony trioxide are heated for 0.25 to 1.5 hours at a temperature of between 1,050° and 1,200°C. Under these firing conditions the highest antimony contents and the highest quantum efficiencies are obtained.

Experiments have shown that it is advantageous to start from a formed non-activated alkaline earth halophosphate or an alkaline earth halophosphate comprising manganese only. In fact, formation of unwanted side phases during activation is substantially prevented in that case. The non-activated halophosphate may be prepared in advance by heating the composite compounds at a temperature of, for example, 700°C.

A method according to the invention is preferred in which the product obtained is again subjected, after homogenizing, to a heat treatment at a temperature of between 700° and 1,200°C in an inert atmosphere. The crystallisation of halophosphate is then improved so that the quantum efficiency of the final product is favourably influenced.

The invention will now be further described with reference to a number of examples.

EXAMPLE I

A luminescent calcium halophosphate activated by trivalent antimony and by bivalent manganese is manufactured as follows.

A mixture is made of:

| | |
|---|---|
| 662 g | $CaHPO_4$ |
| 220 g | $CaCO_3$ |
| 59 g | $CaF_2$ |
| 28 g | $MnNH_4PO_4$ |
| 13 g | $NH_4Cl$ |
| 18 g | $CdCO_3$ |

This mixture is heated in air on an open tray for 3 hours at a temperature of 700° – 800°C. The product obtained is homogenized by pulverizing and sieving and consists of calcium halophosphate in which a small portion of calcium is replaced by cadmium and in which the manganese activator is already incorporated.

300 grams of the mixture pre-fired in the manner described above are put on a tray. Two vessles each containing 15 g of calcium antimonite ($CaO.Sb_2O_3$) are placed on the mixture on the tray. The tray is closed by means of cover and placed in a furnace and is sunsequently heated for 0.5 hour at 1,180°C. During the heat treatment 5 litres of nitrogen per minute are passed through the furnace.

After cooling and pulverizing the product thus obtained consisting of calcium halophosphate activated by antimony and manganese is post-fired in a furnace for 67 minutes at 1,050°C while passing 0.5 litre of nitrogen per minute through the furnace. This post-firing treatment has a favourable influence on the quantum efficiency of the luminescent material.

The powder obtained is ground until all grains are smaller than approximately 10 $\mu$ and subsequently all grains smaller than 2 $\mu$ are separated by means of sedimentation and removed.

The product is now ready for use. Measurements were performed on the powder and the results are summarized in the Table below under Example I.

TABLE I

| | Example I | A | B |
|---|---|---|---|
| Luminous flux | 102.7 | 100 | 84.6 |
| UV.absorption | 105 | 100 | 104.5 |
| Q | 98 | 100 | 81 |
| $Sb^{3+}$-content in % by weight | 1.40 | 0.74 | 1.60 |

The Table states the luminous flux of the poweder upon excitation by ultraviolet radiation (predominantly 254 nm.) and the magnitude of thr absorption of this ultraviolet radiation. For the purpose of comparison column A of the Table includes measurements on a calcium halophosphate of the same composition manufactured in known manner in which the antimony activator in the firing mixture is included as antimony trioxide. The luminous flux and UV-absorption of the known halophosphate are fixed at 100. The Table further states under Q the quotient (luminous flux/UV-absorption)× 100, which is a measure of the quantum efficiency of the luminescent material. Finally the Table states in percent by weight the content of trivalent antimony of the luminescent material. It is clearly evident that with a method according to the invention a luminesent halophosphate is obtained which has a considerably higher UV- absorption than the known halophosphate in which the quantum efficiency has substantially the same value. As a result a higher luminous flux is obtained with the halophosphates according to the invention. In this example the antimony content is found to be a factor of 2 higher than the antimony content of the known halophosphate. Column B of the Table includes measurements on a halophosphate manufactured in known manner in which, however, a large quantity of antimony trioxide is mixed in the firing mixture. It is found that a high antimony content as well as a high UV-absorption are then possible. This is, however, accompanied by a low quantum efficiency so that the luminous flux to be obtained is small.

The luminescent halophosphate manufactured as described in example I, was used in the luminescent screen of low-pressure mercury vapour discharge lamps. The initial luminous flux of these lamps was 77.4 lm/w and after 100 operating hours the luminous flux was 75.9 lm/W which is a decline of only 2 percent. For the purpose of comparison it is to be noted that lamps provided with the known halophosphate used as a reference in the above-mentioned Table under column A have an initial luminous flux of 78.3 lm/W. After 100 hours this luminous flux has decreased by approximately 4 percent to 75.1 lm/W. A method according to the invention is thus found to have the advantage that halophosphates are obtained which exhibit only a slight decline in the luminous flux when used in low-pressure mercury vapour discharge lamps.

EXAMPLE II

Operations are carried out in a manner mainly the same as described under Example I. However, a mixture of calcium antimonate ($CaO.Sb_2O_5$) and calcium pyrophosphate ($Ca_2P_2O_7$) in a molar ratio of 1 : 3 is used as an activator compound. Two vessels each containing 23 g of this activator compound are placed on the pre-fired halophosphate mixture. The heat treatment during activation is effected for 2.5 hours ar 1,140° C. After cooling of the product obtained a post-firing treatment is not performed as is the case in example I, but the product is washed with a mixture of ammonia and hydrogen peroxide. Subsequently the product is ready for use. The powder was measured on the following points:

| | |
|---|---|
| Luminous flux | 97.4 |
| UV-absorption | 103.7 |
| Q | 94 |
| $Sb^{3+}$-content in % by weight | 1.26 |

EXAMPLE III

Operations are again carried out in a manner analogous to those described under example I. The heat treatment during activation is, however, effected at 1,050°C for 1½ hours. Mixtures of calcium antimonite ($CaO.Sb_2O_3$) and calcium pyrophosphate ($Ca_2P_2O_7$) are used as an activator compound, while the molar ratio between pyrophosphate and antimonite is chosen to be 0, 1/5, 1/2, 2/3, respectively. Measurements performed on the powders obtained in this manner are summarized in the Table below.

TABLE II

| Molar ratio activator compound | 0 | 1/5 | 1/2 | 2/3 |
| --- | --- | --- | --- | --- |
| Luminous flux | 98 | 95 | 98 | 98 |
| UV-absorption | 102 | 103 | 103 | 103 |
| Q | 96 | 92 | 95 | 95 |
| $Sb^{3+}$-content in % by weight | 1.46 | 1.32 | 1.34 | 1.26 |

What is claimed is:

1. In a method of preparing a trivalent antimony activated luminescent alkaline earth halophosphate having the apatite structure by contacting gaseous antimony trioxide in an inert atmosphere with a base material at a temperature of between 900° and 1,250°C, said base material comprising at least one substance selected from the group consisting of mixtures of reactants capable of producing alkaline earth halophosphate having the apatite structure, non-activated alkaline earth halophosphate having the apatite structure and manganese activated alkaline earth halophosphate having the apatite structure, the improvement which comprises forming the gaseous antimony trioxide in at least one vessel separated from the base material by heating for at least 0.25 hour at a temperature between 900° and 1,250°C at least one substance selected from the group consisting of the alkaline earth antimonites, cadmium antimonite, manganese antimonite, mixtures of at least one of said antimonites with at least one of calcium and strontium pyrophosphate, mixtures of at least one alkaline earth antimonate with at least one alkaline earth pyrophosphate, mixtures of cadmium antimonate with at least one alkaline earth pyrophosphate and mixtures of manganese antimonate with at least one alkaline earth pyrophosphate, in a molar ratio of antimonate to pyrophosphate of between 4 and 0.5, and contacting the gaseous antimony trioxide obtained with the base material by means of an inert gas stream.

2. The method of claim 1, wherein a first reaction vessel containing the base material is placed in a furnace and one or more further reaction vessels containing the substance from which the gaseous antimony trioxide is formed are placed in the vicinity of the first reaction vessel in the furnace and wherein the furnace is subsequently brought to a temperature of between 900° and 1,250°C for at least 0.25 hour while passing through an inert gas stream.

3. The method of claim 2 wherein the antimonite is selected from the group consisting of calcium antimonite, strontium antimonite and mixtures thereof.

4. The method of claim 2, wherein heating in the furnace is performed for 0.25 to 1.50 hours at a temperature of between 1,050° and 1,200°C.

5. The method of claim 2, wherein after homogenizing the resultant product is heated to a temperature of between 700° and 1,200°C in an inert atmosphere.

* * * * *